(No Model.)
J. A. ISINGER.
ORNAMENTAL CHAIN.
No. 306,017. Patented Sept. 30, 1884.
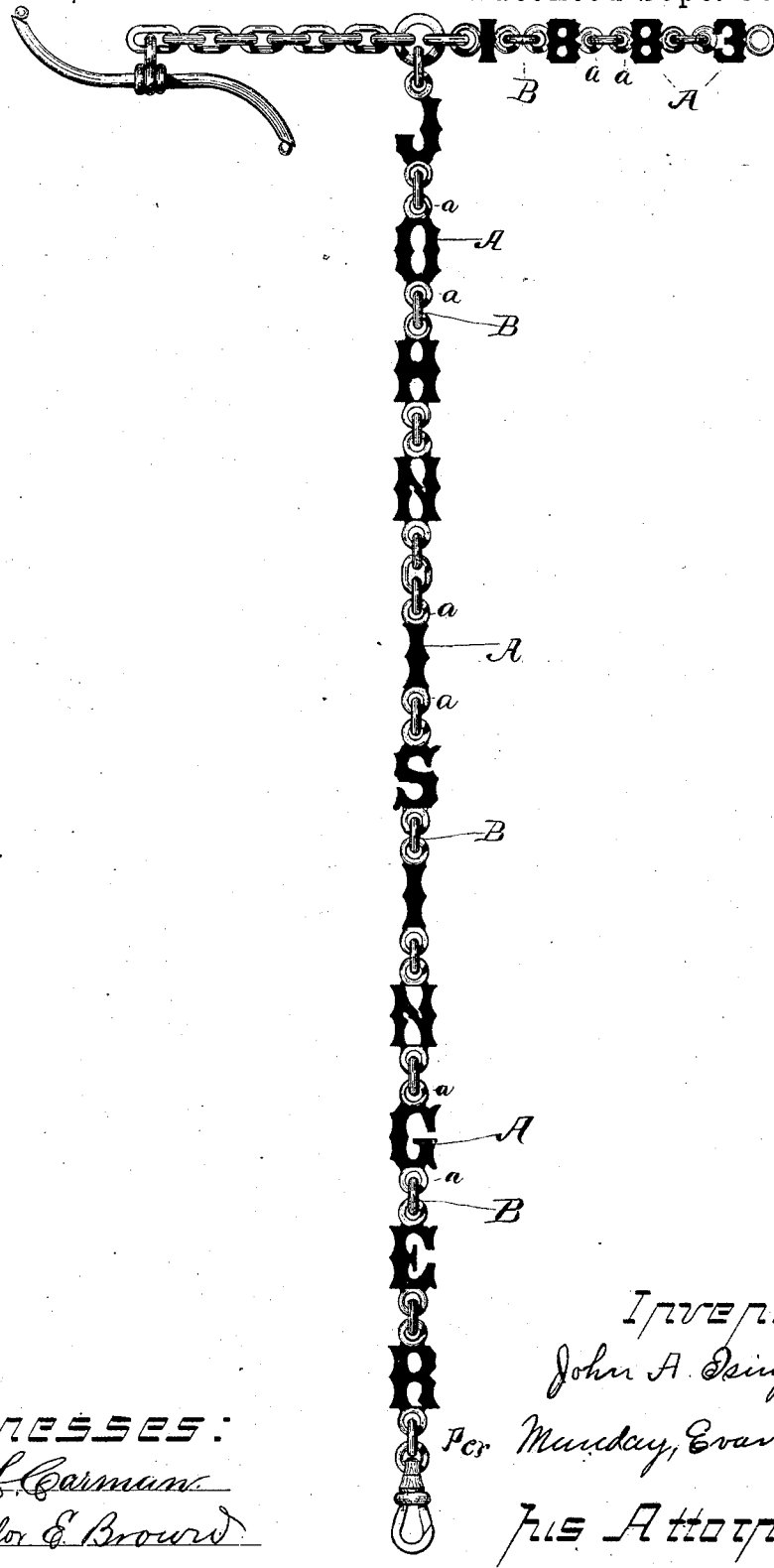
Witnesses:
C. L. Carman
Taylor E. Brown
Inventor:
John A. Isinger
Per Munday, Evarts & Adcock
his Attorneys.

United States Patent Office.

JOHN A. ISINGER, OF NEW LONDON, IOWA, ASSIGNOR TO OTTO YOUNG AND JULIUS SCHNERING, BOTH OF CHICAGO, ILLINOIS.

ORNAMENTAL CHAIN.

SPECIFICATION forming part of Letters Patent No. 306,017, dated September 30, 1884.

Application filed October 20, 1883. (No model.)

*To all whom it may concern:*

Be it known that I, JOHN A. ISINGER, a citizen of the United States, residing in New London, in the county of Henry and State of Iowa, have invented a new and useful Improvement in Watch-Chains, of which the following is a specification.

In my invention some or all the links of the chain are composed of letters. The letter-links are flexibly connected together by means of eyes or hinges with which they are provided at their opposite ends, sides, or corners, and they are arranged to form the owner's name or other designatory word or words—as, for example, a motto or the birthday of the owner—by which the chain may be readily identified if lost or stolen.

In addition to watch-chains, my invention is also useful as applied to bracelets, necklaces, and other chains. It may also be used in making boat-chains, valise-chains, or flexible collars for dogs, and on chains for other analogous purposes where it is desirable and useful to have some word, name, or mark of identification upon the chain itself.

In the accompanying drawing, which forms a part of this specification, I have shown a device embodying my invention.

In said drawing, A A represent the links of the chain, which are made in the form of letters of the alphabet. The letter-links A are provided with eyes $a$ at their opposite extremities, by means of which said links are flexibly connected with interposed connecting-links B. The links B may be of any form, but preferably ordinary closed links analogous in appearance to the eyes $a$. The eyes $a$ are attached rigidly to the letter-links A by soldering, brazing, or they may be made integral with the links, and they are preferably so attached that the letter-link and its eyes will lie flat or in the same plane, so that all the letter-links of the chain may be conveniently arranged to present the faces of the letters in the same direction.

Instead of using the interposed round links B, the eyes of the letter-links may be directly connected or hooked together; but in this case one of the two interlinked eyes should be arranged at about right angles to the other, so that all the letter-links of the chain may lie flat with each other; or, if preferred, one or both the eyes of the letter-link may have a swivel-connection therewith.

The letter-links are preferably formed by stamping the gold or other metal into the form of a letter; but they may be made in other ways, as by making raised, embossed, or engraved letters upon link plates or blocks of metal. The letters may, of course, be of any style, in capital or small type.

The letter of the letter-link may be of different material from its eyes or from the connecting-link B—as, for example, jet—while the link B is of gold or other metal, or the whole chain may be made of the same metal or material.

Instead of connecting the eyes of the links A together by means of the interposed link B, or by linking said eyes together directly, one or both of said eyes may be made double and the two connected together by a pin, thus forming a hinge or joint.

The letter-links A are linked or arranged together to form some word, motto, or name—as, for example, the name of the owner—by means of which the chain may always be identified, as such name or other word is integral with and forms a part of the chain itself, and cannot be detached or separated from it without destroying the chain and its separate links.

As will be seen from the drawing, I mean to be understood by use of the term "letter-links" as including links made in the form of figures.

In the chain shown in the drawing, the letter-links comprising the chain are arranged, for sake of illustration, to spell my own name, (the middle initial, however, being left out through some mistake,) and the figures in the short pendant being arranged to indicate the year 1883.

I am aware of the Letters Patent No. 238,396, granted to Edward A. Jenks, March 1, 1881, and I hereby disclaim the chain or device therein shown; nor do I make any claim, broadly, to a chain having its links provided with letters, but only a chain having its links made in the form or outline of letters, and provided with eyes at each extremity, which are connected together by interposed links, by which means I am enabled to form a much better and more distinctive letter-link chain.

What I claim is—

A chain composed of letter-links A, made in the form and outline of letters, and provided with eyes a at each extremity of said letter-outline, and interposed connecting-links B, said letter-links A being arranged to form a word or words, substantially as specified.

Dated Chicago, October 16, 1883.

JOHN A. ISINGER.

Witnesses:
EDMUND ADCOCK,
C. L. CARMAN.